2,926,190

2-METHYL-2-ALLYL-1,3-PROPANEDIOL DICARBAMATE

Burton Kendall Wasson, Valois, Quebec, and John Mulvin Parker, Montreal, Quebec, Canada No Drawing. Application June 26, 1958
Serial No. 744,673

1 Claim. (Cl. 260—482)

The present invention relates to a new 2-substituted propanediol dicarbamate and to a process for its preparation.

While various substances are known to induce tranquilizing and related effects in vertebrates, many substances are deficient in one or more respects. For example, in many cases, some compounds, for example 2-methyl-2n-propyl-1,3-propanediol dicarbamate, will in certain cases abolish convulsions caused by low-frequency electro-shock or high-frequency electro-shock but at the same time will also cause paralysis. In certain cases, it is not desirable to produce paralysis at the same time as combatting convulsions.

In accordance with the present invention, it has now been found that 2-methyl-2-allyl-1,3-propanediol dicarbamate is effective in abolishing convulsions caused by low-frequency electro-shock and high-frequency electro-shock, without causing the undesirable paralysis.

The new compound of the present invention is prepared by reducing diethyl methyl allyl malonate to give 2-methyl-2-allyl-1,3-propanediol. This is followed by the formulation of the di(chlorocarbonate) by the use of phosgene and finally amination with anhydrous ammonia or ammonium hydroxide. The intermediate propanediol and dichlorocarbonate need not be isolated or purified as the resulting end product is satisfactory. When prepared by the aforesaid process, the product is normally isolated as a white crystalline solid.

The new propanediol dicarbamate of the present invention has an $LD_{50}$ of 1750 mg./kg. and a $PD_{50}$ (intraperitoneal) of 900 mg./kg. At a dosage of 450 mg./kg. which is ½ the $PD_{50}$, the product of the present invention modified convulsions produced by low-frequency electro-shock (psychomotor) (3 seconds at six shocks per second, pulse width 1 millisecond, current of 25 milliamperes) and abolished convulsions produced by high-frequency electro-shock (grand mal) (0.2 second at 100 shocks per second, pulse width 1 millisecond, current of 50 milliamperes) in mice, without producing paralysis. At a dosage of 400 mg./kg. 2-methyl-2n-propyl-1,3-propanediol dicarbamate paralyzed nine out of ten mice while abolishing both types of convulsions.

Example

The following example will illustrate the preparation of the novel products of the present invention:

30 grams of diethyl methyl allyl malonate was reduced with lithium aluminum hydride to give 15.0 gm. of 2-methyl-2-allyl-1,3-propanediol. 2-methyl-2-allyl-1,3-propanediol (13.0 gm.) was treated with phosgene, toluene, chloroform and antipyrine and then, without removal of the antipyrine, the mixture was cooled to —10° C., treated with anhydrous ammonia, the precipitate collected triturated with water, recrystallized from water, and dried to give on recrystallization from methyl alcohol and water, 10.6 gm. of 2-methyl-2-allyl-1,3-propanediol dicarbamate, M.P. 118–121° C.

This application is a continuation-in-part of our application Serial Number 669,701, filed on July 3, 1957, now abandoned.

We claim:

As a compound for abolishing convulsions without causing paralysis, 2-methyl-2-allyl-1,3-propanediol dicarbamate.

References Cited in the file of this patent

Berger: J. Pharm. and Exp. Ther., vol. 104, pp. 229–33 (1952).

Miltown (pub. by Wallace Laboratories, New Brunswick, N.J., 1956), pp. 6–24.